United States Patent [19]

Adams

[11] Patent Number: 5,567,875
[45] Date of Patent: Oct. 22, 1996

[54] MODULAR GAS METER ASSEMBLY AND ASSOCIATED MANIFOLD

[75] Inventor: David P. Adams, Covington, Ky.

[73] Assignee: Schlumberger Industries, Inc., Norcross, Ga.

[21] Appl. No.: 435,823

[22] Filed: May 5, 1995

[51] Int. Cl.$^6$ .............................. G01F 15/14; G01F 15/18; F16L 35/00
[52] U.S. Cl. ................................. 73/201; 285/30
[58] Field of Search ............................ 73/198, 201, 273; 285/30, 150

[56] References Cited

U.S. PATENT DOCUMENTS

| | | | |
|---|---|---|---|
| 2,826,214 | 3/1958 | Volker | 285/30 |
| 2,844,962 | 7/1958 | Resko et al. | 73/273 |
| 2,881,012 | 4/1959 | Rings | 285/150 |
| 3,296,859 | 1/1967 | Stewart | 73/201 |
| 3,296,860 | 1/1967 | Smith et al. | 73/201 |
| 3,542,403 | 11/1970 | Douglas | 285/30 |
| 5,257,538 | 11/1993 | Spendell | 73/198 |
| 5,315,869 | 5/1994 | Bier et al. | 73/201 |

FOREIGN PATENT DOCUMENTS

| | | | |
|---|---|---|---|
| 3104220 | 8/1982 | Germany | 73/201 |
| 756913 | 9/1956 | United Kingdom | 73/201 |

*Primary Examiner*—Richard Chilcot
*Assistant Examiner*—Paul D. Amrozowicz
*Attorney, Agent, or Firm*—Leonard W. Pojunas

[57] ABSTRACT

A gas meter installation comprises a gas meter and a regulator which are attached to a manifold. The manifold connects to a utility pipe for supplying gas and includes an orifice and various passageways for routing the gas from the utility pipe to the regulator, from the regulator to the meter, and from the meter to a house or other type of consumer. The manifold preferably has a shut-off valve integrated into the body of the manifold so that the manifold may be connected directly to the ground pipe without requiring a separate connection to a shut-off valve. The manifold greatly simplifies the installation by eliminating a number of pipes and fittings that were previously used to mount the shut-off valve, regulator, and meter together. The manifold also permits attachment and detachment of the meter or regulator independently of each other so that these components may be individually serviced or replaced.

15 Claims, 7 Drawing Sheets

5,567,875

MODULAR GAS METER ASSEMBLY AND ASSOCIATED MANIFOLD

BACKGROUND OF THE INVENTION

1. Field of the Invention

The present invention generally relates to gas meters, and, more particularly, to a modular gas meter assembly and associated manifold for permitting independent attachment and detachment of a gas meter, pressure regulator, and valve.

2. Description of the Prior Art

With reference to FIG. 1, a typical gas meter installation comprises a service valve or on/off valve 10, a pressure regulator 20, and a gas meter 40. The service valve 10 is connected to a valve body 14 of the regulator 20 through a straight pipe 12 and the valve body 14 is connected to the meter 40 through a straight pipe 22, elbow 24, and meter bar 30. The gas flows through the valve 10, through the pressure regulator 20, and into an inlet 42 of the meter 40. After passing through a measuring assembly within the meter 40, the gas flows out an outlet 44 and into a house or other structure for consumption. The inlet 42 of the meter is typically located at an upper left portion of the meter 40 and the outlet 44 is typically located at an upper right portion of the meter 40.

As discussed above, the meter installation of FIG. 1, in addition to the individual main components of the service valve 10, regulator 20, and meter 40, has a number of additional pipes, fittings, and other members for interconnecting the valve 10, regulator 20, and meter 40 to each other. These components include the pipes 12 and 22, the elbow 24, the meter bar 30, and nuts 32.

These extra components render it rather difficult to assemble or disassemble the installation and to service the installation. For instance, in order to replace a faulty regulator 20, the regulator 20 must be disconnected from the service valve 10 and from the meter bar 30 by removing pipes 12 and 22 from the regulator 20. A new regulator 20 is then attached to the separate pipes 12 and 22 to join the regulator 20 to the service valve 10 and meter 40.

U.S. Pat. No. 5,257,538 to Spendell provides an example of a more recent type of meter installation. With this type of meter installation, a flowmeter, pressure-control device, and a shut-off valve are installed within a single housing. The flowmeter is permanently installed within the housing while the pressure-control device and the shut-off valve are modularly constructed in two parts and can be removed from the housing.

The meter installation of the type in the Spendell patent offers the advantages of being able to easily replace one shut-off valve for another valve or to replace one pressure-control device for another pressure-control device. This installation can therefore be easily adjusted to suit the needs of a particular application by inserting the appropriate modules.

Although the meter installation of the type in the Spendell patent would be easily installed or removed, the meter installation has some practical problems. For instance, if only the meter is faulty, the entire installation would have to be replaced. While the meters often have a lifetime much longer than some other components within a meter installation, it is common practice in the industry to bring the meters in from the field and cycle the meters through service/maintenance shops to ensure that the meters are accurate and to make any necessary calibration adjustments. Since only the meters need to be removed from the meter installation, it is burdensome and undesirable to remove the entire meter installation including the shut-off valve and pressure regulator.

SUMMARY OF THE INVENTION

An object of the present invention is to provide a modular meter installation that permits independent attachment and detachment of a pressure regulator, gas meter, and service valve.

Another object of the present is to provide a manifold which can receive, integrate, and permit detachment of each of the pressure regulator, gas meter, and service valve.

Additional objects, advantages, and novel features of the invention will be set forth in the description which follows, and will become apparent to those skilled in the art upon reading this description or practicing the invention.

To achieve the foregoing and other objects, a novel modular gas meter installation is implemented with a novel manifold. A pressure regulator and gas meter are attached to the manifold, and a service valve may be optionally implemented in the manifold. The manifold according to the present invention, as embodied and broadly described herein, receives gas from a supply pipe and routes the gas to an input of the pressure regulator. The manifold routes a regulated gas output from the pressure regulator into an input of the gas meter and also routes gas output from the gas meter to an output of the gas meter installation. The manifold is preferably a single unitary structure constructed from cast iron.

The manifold, according to another aspect of the invention, has an inlet cylinder with a first end for connecting the manifold to a gas supply pipe. An orifice is formed at a second end of the inlet cylinder and opens to a first surface of the manifold. The orifice connects a regulator to the first surface of the manifold and routes gas from the inlet cylinder to an input of the regulator. A first passageway is formed adjacent to the orifice and opens to a second side of the manifold where the manifold receives a gas meter. The first passageway routes a regulated gas output from the regulator into an input of the meter. An outlet cylinder of the manifold has a first end forming an output of the entire gas meter installation and is used to route gas to a gas appliance. The manifold has a second passageway which leads from an output of the meter to a second end of the outlet cylinder.

The invention, according to yet another aspect, relates to a method of assembling a gas meter installation. The method generally comprises the steps of attaching one end of an inlet cylinder of a manifold to a gas supply pipe and mounting a gas meter to one, surface of the manifold. The gas meter is mounted so that an input to the meter is aligned with one end of a first passageway in the manifold and an output from the meter is aligned with one end of a second passageway in the manifold. A second end of the second passageway forms an output of the entire gas meter installation and may be used to connect the installation to a house or other suitable type of consumer. A regulator is mounted to a second surface of the manifold with an output of the regulator being connected to a second end of the first passageway in the manifold and an input to the regulator being connected to an orifice which leads to a second end of the inlet cylinder.

BRIEF DESCRIPTION OF THE DRAWINGS

The accompanying drawings, which are incorporated in, and form a part of, the specification, illustrate certain preferred embodiments of the present invention and, together with the description, serve to explain the principles of the invention. The drawings are not necessarily to scale, emphasis instead being placed upon clearly illustrating the principles of the invention. In the drawings.

DETAILED DESCRIPTION OF THE PREFERRED EMBODIMENT

Figure 2:
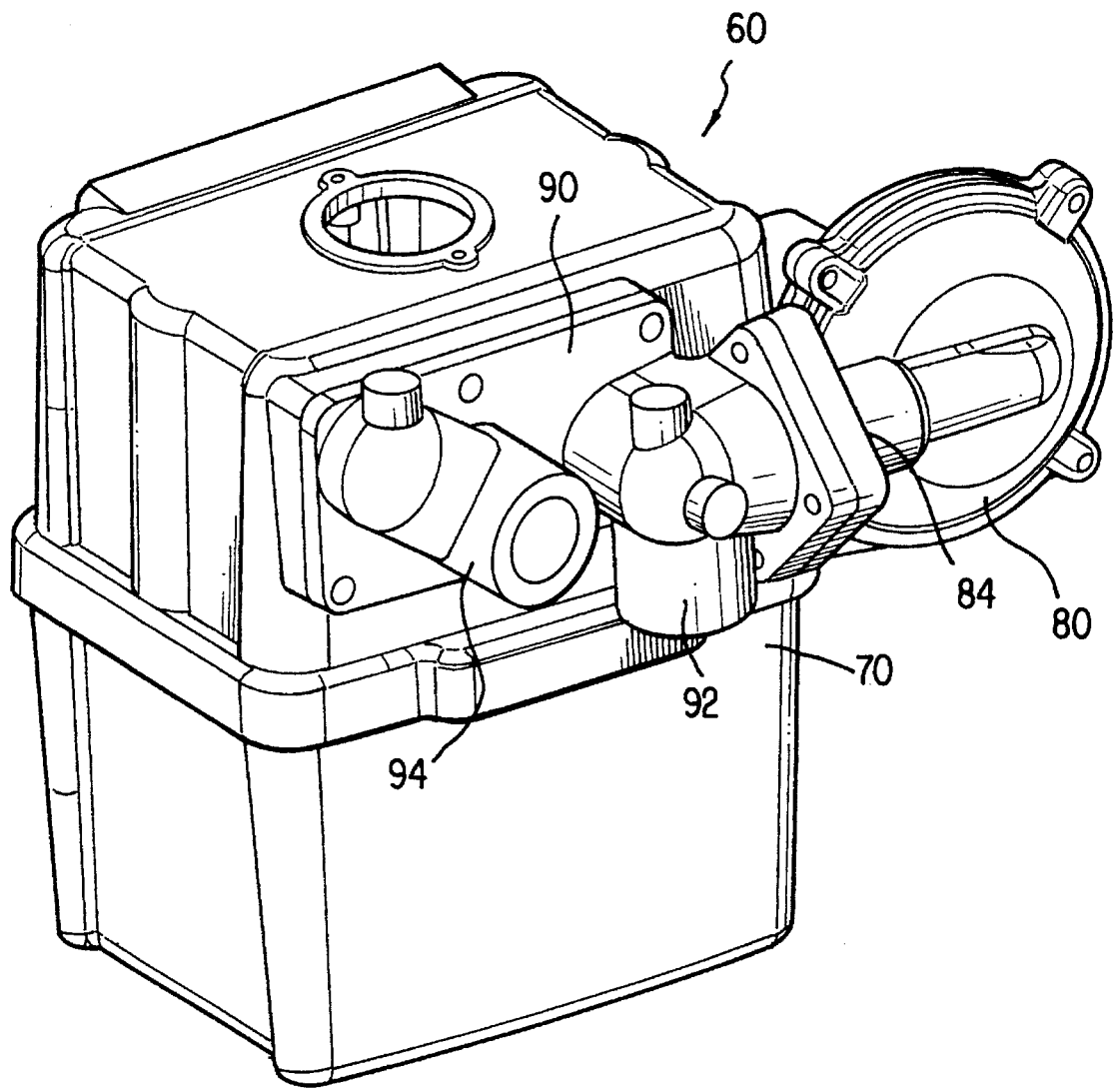
FIG. 2 is a perspective rear view of a novel modular gas meter installation having a first embodiment of a novel manifold.

Reference will now be made in detail to the preferred embodiments of the invention. With reference to FIG. 2, a meter installation 60 according to an embodiment of the invention comprises a gas meter 70, a pressure regulator 80, and a manifold 90. A pipe from the gas utility company (typically from the ground; not shown) supplying gas would be connected to a inlet cylinder 92 of the manifold 90. In general, gas is directed through the manifold 90 into the pressure regulator 80, from the pressure regulator 80 back through the manifold 90 and into the meter 70, and then from the meter 70 back into the manifold 90. The gas exits the manifold 90 and enters a house or other type of gas consuming structure through an outlet cylinder 94.

With the meter installation 60 according to the invention, the meter 70 and the pressure regulator 80 can be attached/detached to/from the manifold 90 independently of each other. Thus, when the meter 70 or pressure regulator 80 needs to be serviced or replaced, only the meter 70 or pressure regulator 80 needs to be removed. The manifold 90 therefore provides a completely modular installation 60 in which the meter 70 and pressure regulator 80 can be independently removed and attached.

Figure 1:
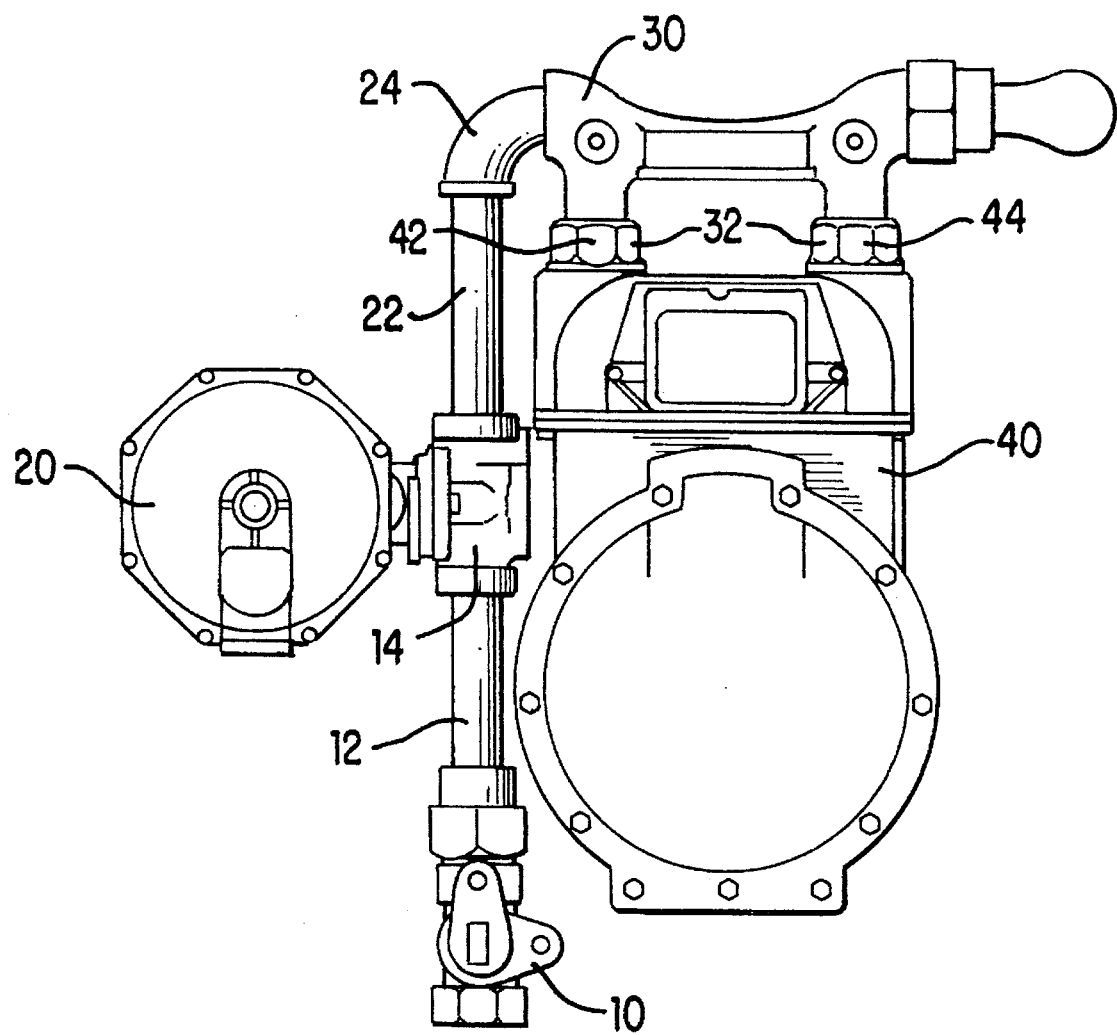
FIG. 1 is a front view of a typical meter installation.

In addition to the modular features provided by the manifold 90, the singular construction of the manifold 90 has advantages. The manifold routes the gas from a supply pipe to the pressure regulator 80, from the pressure regulator 80 to the meter 70, and from the meter 70 to the house. Significantly, the manifold 90 replaces the pipes 12, 22, meter bar 30, elbow 24 and other components which were necessary with the conventional meter installation of FIG. 1 and therefore greatly simplifies the assembly of the meter installation 60.

Figure 3:
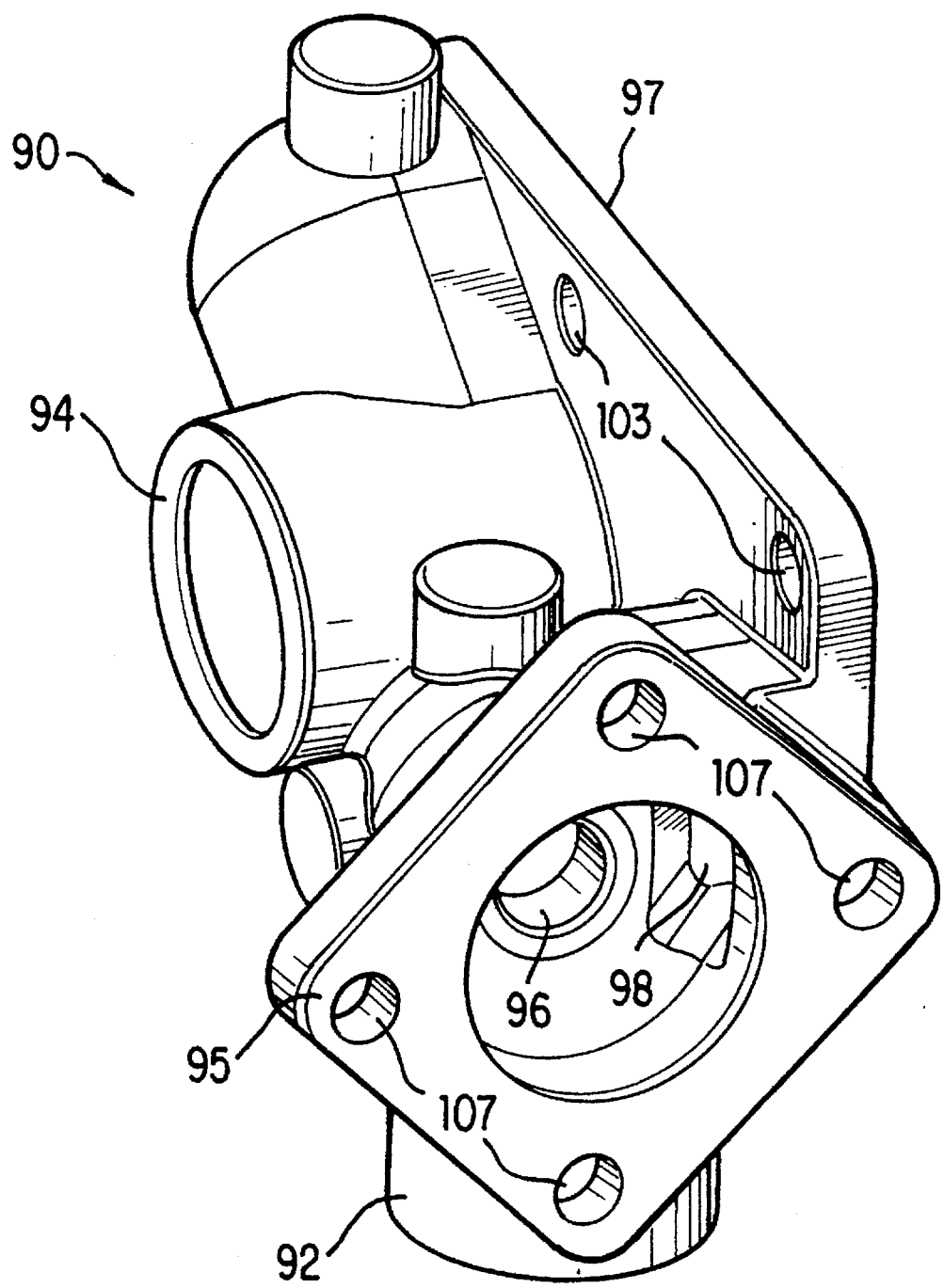
FIG. 3 is a perspective side view of the first embodiment of the manifold of FIG. 2.

FIG. 3 depicts the manifold 90 with both the pressure regulator 80 and the meter 70 removed from the manifold 90. As shown in the figure, the manifold 90 has a diamond-shaped mounting plate 95 with holes 107 for mounting the pressure regulator 80 to the manifold 90. The manifold 90 further has an orifice 96 for directing the gas from the inlet cylinder 92 to the entrance of the pressure regulator 80. After the gas passes through the pressure regulator 80, the gas is directed through a second passageway 98 formed in the manifold 90 in order to enter the meter 70. The meter 70 would be mounted to a planar front surface 97 of the manifold 90 which, in this view, would be to the right of the manifold 90.

Figure 4:
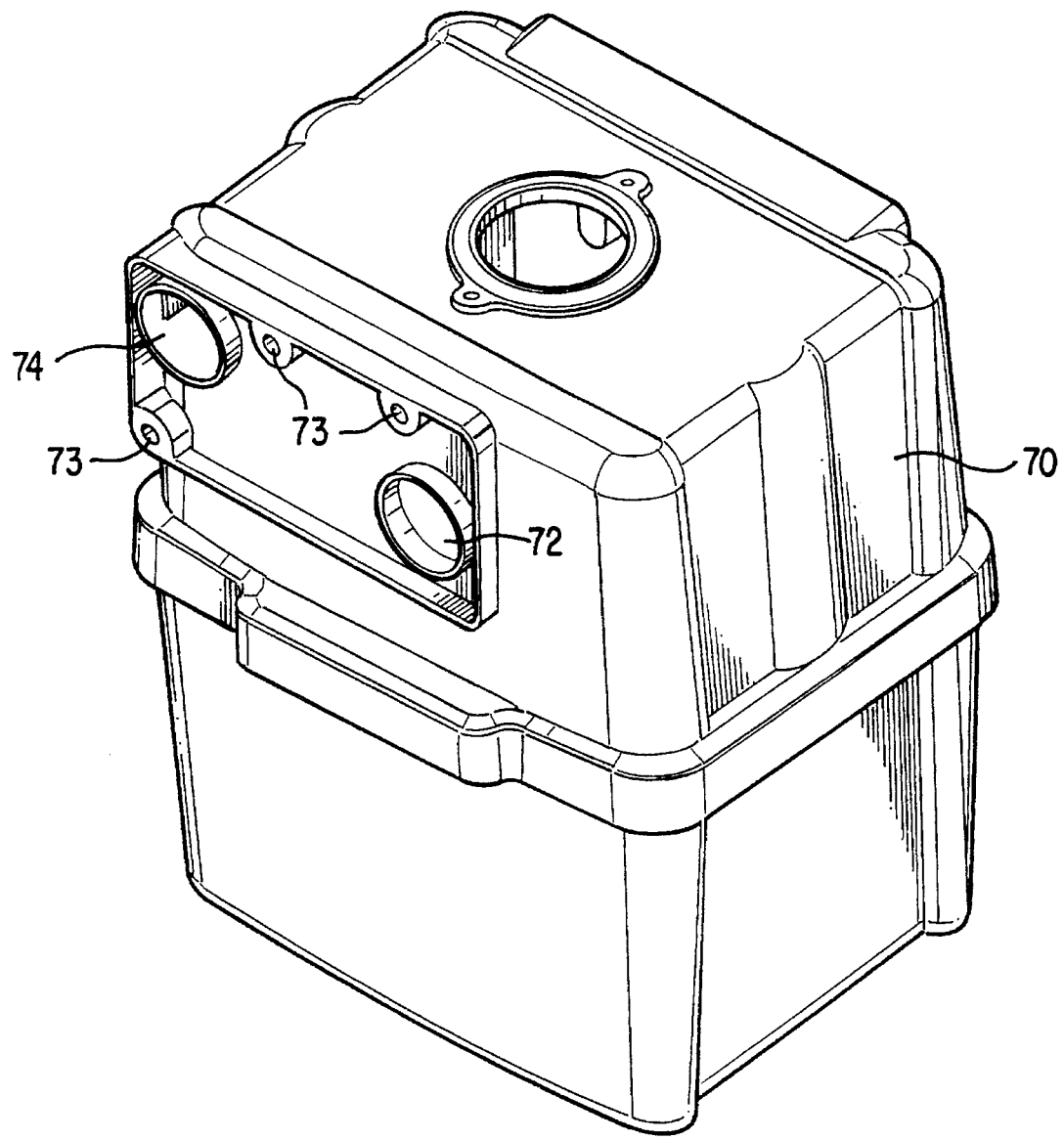
FIG. 4 is a perspective rear view of the meter of FIG. 2 with the manifold detached from the meter installation.

As shown in FIG. 4, the meter 70 is different from a typical meter, such as meter 40 (FIG. 1), in that a gas inlet port 72 and a gas outlet port 74 are located at the rear side of the meter 70 rather than at the upper portion of the meter 70. Because of the new locations of the inlet port 72 and outlet port 74, the routing of the gas within the meter 70 would also be different from the routing of gas within a conventional meter, such as the meter 40 in FIG. 1. The modification of the piping within the meter 70 will be apparent to those skilled in the art and, accordingly, will not be described in any further detail. Also, in general, the operations and functioning of the meter 70 does not form part of the present invention and any suitable type of circuitry or apparatus for measuring the flow of gas may be used within the meter 70.

Figure 5:
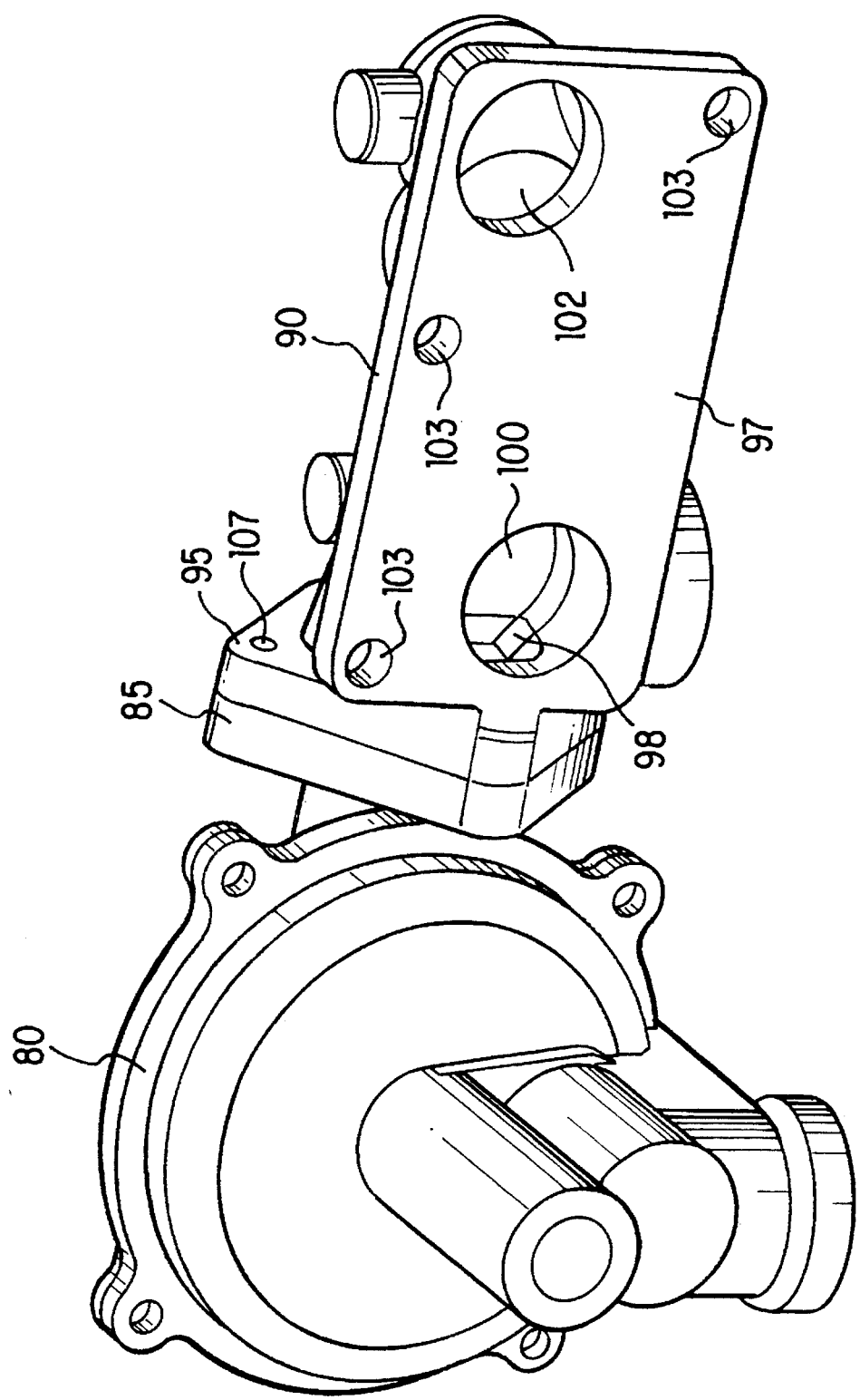
FIG. 5 is a perspective front view of the manifold and attached pressure regulator of FIG. 2.

FIG. 5 is a front view of the manifold 90 and pressure regulator 80 with the meter 70 detached. The front surface 97 of the manifold 90 has a first opening 100 which mates with the inlet port 72 for the meter 70 and a second opening 102 which mates with the outlet port 74 for the meter 70. The openings 100 and 102 are preferably sealed to the inlet and outlet ports 72 and 74, respectively, with 0-rings or other suitable type of sealant. As shown in the figure, the second passageway 98 routes gas from the pressure regulator 80, through the manifold 90, and into the meter 70.

To mount the manifolds 90 to the meter 70, apertures 103 in the manifold 90 are aligned with apertures 73 in the meter 70 and bolts (not shown) are passed through the apertures 103 and 73. Although the bolts might be received by nuts within the meter 70, the apertures 73 within the meter 70 are preferably threaded to thereby engage the bolts directly to the meter 70. The manifold 90 may be mounted to the meter 70 in other ways which will be apparent to those skilled in the art.

To mount the pressure regulator 80 to the manifold 90, a valve body 84 of the pressure regulator 80 is screwed onto the orifice 96 and the mounting plate 95 of the manifold 90 is aligned with a diamond-Shaped mounting plate 85 forming part of the valve body 84. A set of bolts are then passed through the holes 107 in the mounting plate 95 and through a corresponding set of holes (not shown) in the mounting plate 85. The pressure regulator 80 selectively opens the orifice 96 to the passageway 98 in order to maintain the pressure of the gas at a predetermined level. Any suitable pressure regulator 80 may be used.

The valve body 84 to the pressure regulator 80, however, would be different from the valve body 14 of a conventional regulator 20. With a conventional valve body 14, the inlet and outlet to the valve body 14 are parallel to each other and are vertically aligned. With the valve body 84 of pressure regulator 80, in contrast, the orifice 96 and passageway 98 are horizontally oriented but are roughly at 90° relative to each other. The design and formation of valve body 84 will be apparent to one skilled in the art and will therefore not be described in any further detail.

Figure 6A:
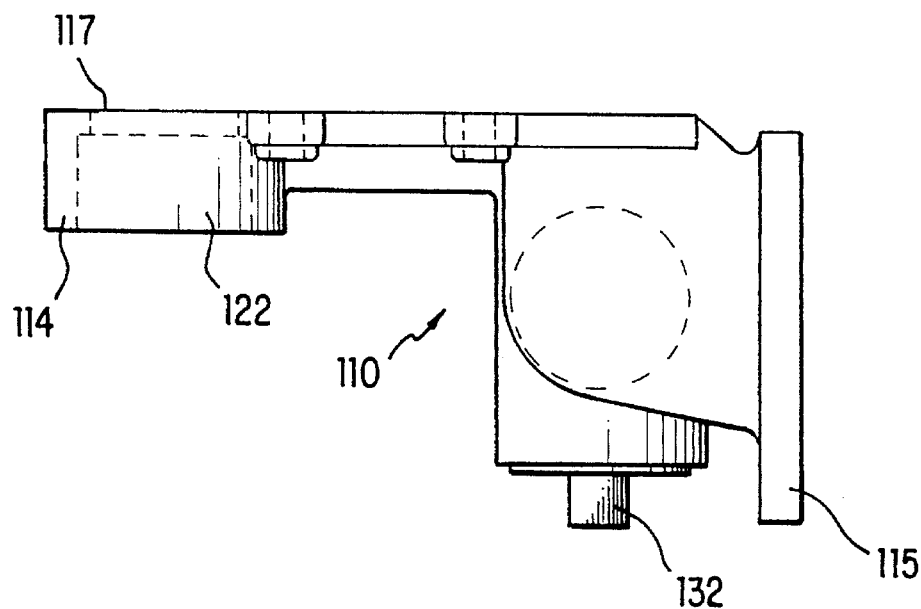
FIGS. 6(A), (B), and (C) are top, front, and side plan views, respectively, of a second embodiment of the manifold which has an integral shut-off valve.
Figure 6B:
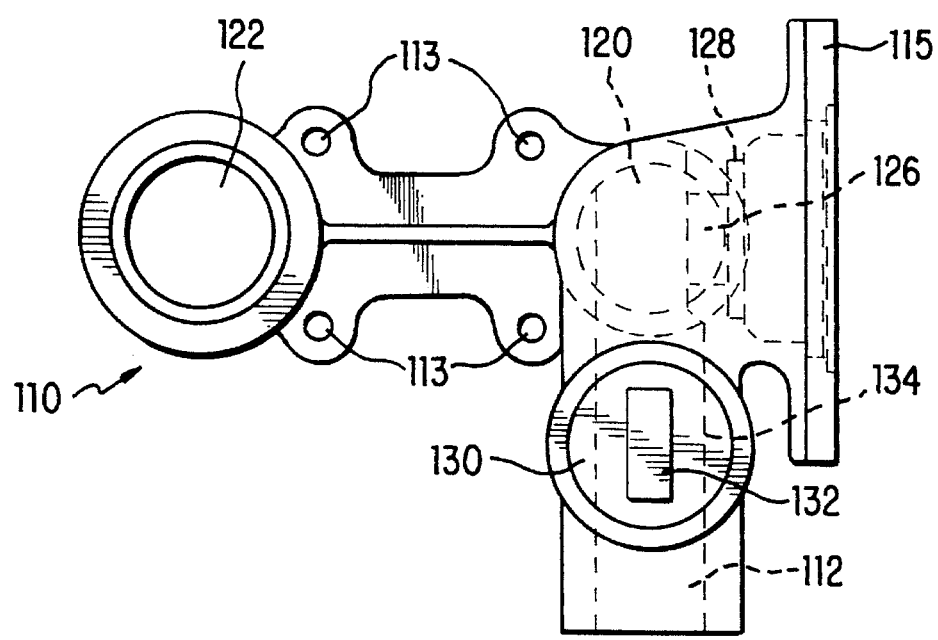
Figure 6C:
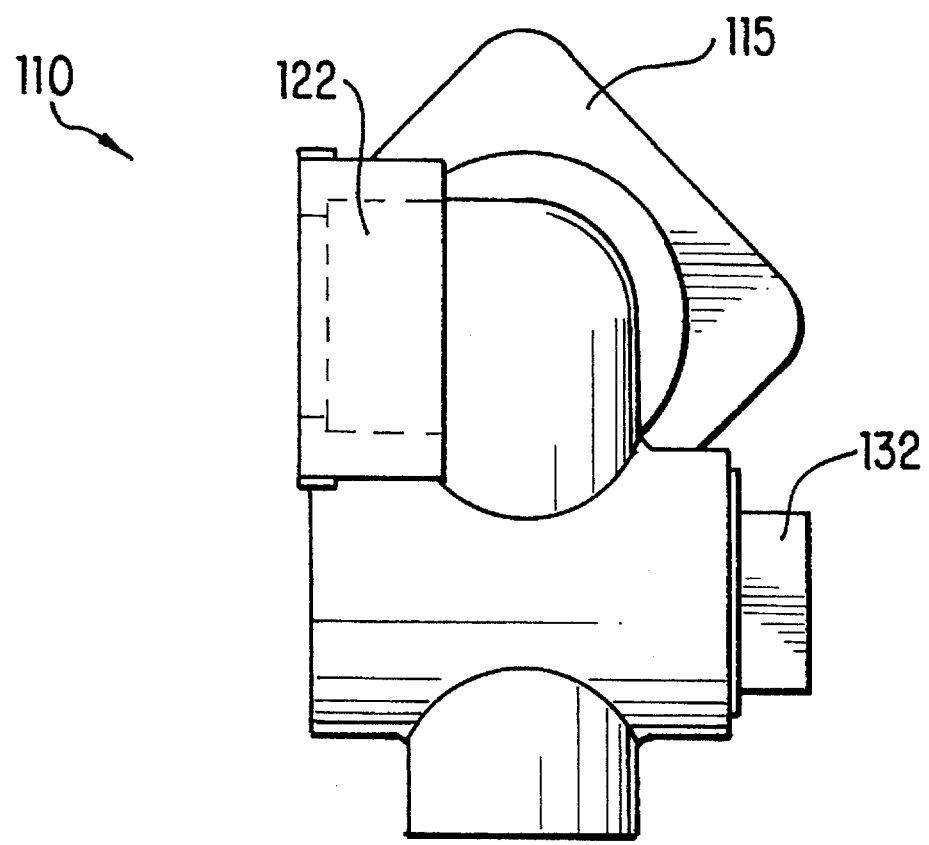

A second embodiment of a manifold 110, as shown in FIGS. 6(A) to 6(C), has an inlet cylinder 112 for receiving a supply of gas from a ground pipe or other suitable source. The manifold 110, unlike manifold 90, comprises a service or shut-off valve 130 having a knob 132 which can be rotated to selectively turn on or off the supply of gas. When the knob 132 is in the "on" position shown in FIG. 6(B), an internal passageway 134 within the shut-off valve 130 is aligned with the inlet cylinder 112, thereby permitting the free flow of gas through the valve 130. When the knob 132 is rotated 90° to the "off" position, the passageway 134 would be completely disconnected from the inlet cylinder 112 and the supply of gas would be blocked.

After the gas passes through the valve 130 in manifold 110, the gas is routed through an orifice 126 and then into the regulator 80. The manifold 110 has a passageway 128 for routing gas from the regulator 80 into the meter 70 and has an outlet cylinder 122 for connecting the manifold 110 to a consumer of gas. The manifold 110 has openings 120 and 122 which align with the inlet and outlet ports 72 and 74, respectively, of the meter 70, a diamond-shaped mounting plate 115 for mounting the regulator 80 to the manifold 110, and a set of holes 113 for mounting the meter 70 to the manifold 110.

The manifold 110 is preferable over the manifold 90 in several aspects. For one, the manifold 110 has the shut-off valve 130 integrated into the body of the manifold 110 whereas with manifold 90 a separate shut-off valve would be required. Consequently, the manifold 110 further simplifies the installation by reducing the number of components forming a gas meter installation. The manifold 110 has a reduced mass and weight in comparison to the manifold 90 due to the cut-outs near holes 113 and due to the alignment of the outlet cylinder 114 with the opening from the outlet port 74 of the meter 70.

The manifolds 90 and 110 are preferably constructed from cast iron. The invention, however, is not limited to this particular type of material as the manifolds 90 and 110 may be constructed from other materials which will be apparent to those skilled in the art. The manifolds 90 and 110 provide a unitary structure for a modular meter installation 60 in which the meter 70 and regulator 80 may be independently removed and provides the additional benefit of having the shut-off value 130 integrated into the body of the manifold 110.

While manifold 90 has been described as serving the meter 70 and regulator 80 and manifold 110 has been described as serving the meter 70, regulator 80, and shut-off valve 130, a manifold according to the invention may serve other combination of elements. For instance, a manifold according to the invention might not serve the meter 70 but could serve the regulator 80 and could contain the shut-off valve 130. Alternatively, a manifold according to the invention might not serve the regulator 80 but could serve the meter 70 and could contain the shut-off valve 130.

The foregoing description of the preferred embodiments of the invention has been presented for purposes of illustration and description. It is not intended to be exhaustive or to limit the invention to the precise form disclosed. Many modifications and variations are possible in light of the above teaching.

The embodiments were chosen and described in order to explain the principles of the invention and their practical application to thereby enable others skilled in the art to utilize the invention and Various embodiments and with various modifications as are best suited to the particular use contemplated. It is intended that the scope of the invention be defined by the claims.

Wherefore, the following is claimed:

1. A gas meter assembly, comprising:

a gas meter having an inlet port and an outlet port, said gas meter indicating a volume of gas traveling through said gas meter from said inlet port to said outlet port;

a pressure regulator for selectively opening an input to said pressure regulator so that gas output from said pressure regulator is maintained at a constant pressure; and a manifold comprising:

an inlet cylinder having a first end for connecting said manifold to a supply pipe;

first means for defining an orifice near a second end of said inlet cylinder, said input to said regulator being aligned with said orifice and mounted to said first defining means;

second means for defining a first passageway for routing gas output from said regulator to said inlet port of said gas meter;

an outlet cylinder having a first end which is an output of said gas meter assembly; and third means for defining a second passageway for routing gas from said outlet port of said gas meter to a second end of said outlet cylinder.

2. The gas meter assembly as set forth in claim 1, wherein said manifold further comprises a shut-off valve located along a length of said inlet cylinder.

3. A manifold for use in a gas meter installation, comprising:

first means for receiving gas from a supply pipe and for routing said gas to an input of a pressure regulator;

second means for routing a regulated gas output from said pressure regulator to an input of a gas meter; and third means for routing gas output from said gas meter to an output of said gas meter installation;

wherein said first, second, and third means are part of a single unitary structure.

4. The manifold as set forth in claim 3, wherein said single unitary structure is comprised of cast iron.

5. The manifold as set forth in claim 3, further comprising fourth means for selectively turning on or off said gas from said supply pipe to said pressure regulator and wherein said fourth means is incorporated into said unitary structure.

6. The manifold as set forth in claim 3, wherein said first means comprises an inlet cylinder having one end connected to said supply pipe and a second end connected to an orifice, said orifice to be connected to said regulator.

7. The manifold as set forth in claim 3, wherein said second means defines a passageway leading from an output of said regulator to said input to said meter.

8. The manifold as set forth in claim 3, wherein said third means defines a passageway leading from an output of said gas meter to said output of said gas meter installation.

9. A manifold for use in a gas meter installation, comprising:

an inlet cylinder having a first end to be connected to a gas supply pipe;

first means for defining an orifice at a second end of said inlet cylinder which opens to a first surface of said manifold, said first defining means for connecting a regulator to said first surface of said manifold and said orifice for routing said gas from said inlet cylinder to an input to said regulator;

second means for defining a first passageway adjacent to said orifice which opens to a second surface of said manifold, said second surface of said manifold for receiving a meter and said first passageway for routing a regulated gas output from said regulator into an input of said meter;

an outlet cylinder having a first end comprising an output of said gas meter installation, said first end for routing said gas to a gas appliance; and third means for defining a second passageway leading from an output of said meter to a second end of said outlet cylinder.

10. The manifold as set forth in claim 9, further comprising an on-off valve formed along a length of said inlet cylinder, said on-off valve selectively connecting gas from said first end of said inlet cylinder to said second end of said inlet cylinder.

11. The manifold as set forth in claim 9, wherein said first surface and said second surface comprise sides of said manifold which are perpendicular to each other.

12. The manifold as set forth in claim 9, wherein said output of said meter is aligned with said output of said gas meter installation.

13. The manifold as set forth in claim 9, wherein said manifold consists of a single structure.

14. The manifold as set forth in claim 13, wherein said single structure is comprised of cast iron.

15. A method of assembling a gas meter installation, comprising the steps of:

attaching one end of an inlet cylinder of a manifold to a gas supply pipe;

mounting a gas meter to one surface of said manifold with an input to said meter being aligned with one end of a first passageway in said manifold and an output from said meter being aligned with one end of a second passageway in said manifold, a second end of said second passageway forming an output of said gas meter installation; and mounting a regulator to a second surface of said manifold with an output Of said regulator being connected to a second end of said first passageway in said manifold and an input to said regulator being connected to an orifice, said orifice leading to a second end of said inlet cylinder.

* * * * *